United States Patent [19]

Nagasawa et al.

[11] Patent Number: 4,963,611
[45] Date of Patent: Oct. 16, 1990

[54] VINYL ACETATE RESIN EMULSION COMPOSITION

[75] Inventors: Shigeru Nagasawa, Hasuda; Hisao Noziri, Oomiya; Yoshizumi Nakai, Iwatsuki; Yasuaki Araki, Oomiya; Eizo Sakamoto, Urawa; Masao Yagasaki, Saitama; Mutsumi Kozima, Sakai, all of Japan

[73] Assignee: Konishi Co., Ltd., Osaka, Japan

[21] Appl. No.: 463,007

[22] Filed: Jan. 9, 1990

Related U.S. Application Data

[63] Continuation of Ser. No. 105,059, Oct. 6, 1987, abandoned.

[30] Foreign Application Priority Data

Sep. 1, 1987 [JP] Japan ............... 62-218365

[51] Int. Cl.$^5$ ............................ C08F 2/16
[52] U.S. Cl. ............... 524/459; 524/376; 524/761
[58] Field of Search ............ 524/376, 459, 761

[56] References Cited

U.S. PATENT DOCUMENTS

| | | | |
|---|---|---|---|
| 2,581,844 | 1/1952 | Eggleston | 526/83 |
| 2,614,088 | 10/1952 | Bristol et al. | 524/459 |
| 2,662,866 | 12/1953 | Bristol et al. | 524/459 |
| 2,694,052 | 11/1954 | Canterino | 524/459 |
| 2,833,737 | 5/1958 | Mark et al. | 524/388 |
| 2,965,623 | 12/1960 | Wechsler et al. | 526/81 |
| 3,010,929 | 11/1961 | Jones | 524/459 |
| 3,532,658 | 10/1970 | Gintz | 524/459 |
| 3,661,696 | 5/1972 | Knutson | 524/459 |
| 3,668,165 | 6/1972 | Bergmeister et al. | 524/459 |
| 3,734,819 | 5/1973 | Knutson | 524/459 |
| 3,816,362 | 6/1974 | Tsuchihara et al. | 524/459 |
| 3,830,761 | 8/1974 | Lenney | 524/459 |
| 4,474,920 | 10/1984 | Kyminas | 524/459 |
| 4,521,561 | 6/1985 | Hausman et al. | 524/459 |

FOREIGN PATENT DOCUMENTS

| | | | |
|---|---|---|---|
| 0548711 | 11/1957 | Canada | 524/459 |
| 0814511 | 6/1969 | Canada | 524/459 |
| 2112769 | 9/1972 | Fed. Rep. of Germany | 524/459 |
| 0040548 | 12/1970 | Japan | 524/459 |
| 0120680 | 7/1983 | Japan | 524/459 |
| 0943207 | 12/1963 | United Kingdom | 524/459 |
| 2089355 | 6/1982 | United Kingdom | 524/459 |

*Primary Examiner*—Joseph L. Schofer
*Assistant Examiner*—J. M. Reddick
*Attorney, Agent, or Firm*—Reed Smith Shaw & McClay

[57] ABSTRACT

Vinyl acetate resin emulsion composition produced by the addition of a water soluble compound having alcoholic OH group during emulsion-polymerization or emulsion-copolymerization reaction to vinyl acetate resin emulsion which is obtained by emulsion-polymerization or emulsion-copolymerization of vinyl acetate under the presence of polyvinyl alcohol.

6 Claims, 5 Drawing Sheets

F I G. 9

4,963,611

VINYL ACETATE RESIN EMULSION COMPOSITION

This is a continuation of copending application Ser. No. 105,059, filed on Oct. 6, 1987, now abandoned.

BACKGROUND OF THE INVENTION

This invention relates to vinyl acetate resin emulsion composition outstanding in features such as excellent workability, heat resistance, water resistance, storage life, etc.

Vinyl acetate resin emulsion obtained by the emulsion polymerization of vinyl acetate monomer, using water soluble high polymer such as polyvinyl alcohol as the protective colloid, has been widely used for adhesives, paint and for finishing paper and fibers.

Vinyl acetate resin emulsion used so widely, however, is not free from various faults. Some of these faults are; (1) the viscosity is temperature dependent, i.e., it increases significantly in winter time when the temperature is low, and makes it difficult to use the emulsion since the emulsion is inferior in the workability, (2) the viscosity also significantly increases at high solids content which also makes it difficult for processing, (3) separation and sedimentation occurs at low solids content and decreases the storage life, (4) the use of water soluble high polymer such as polyvinyl alcohol as the protective coloid causes low water resistance of the resulting film.

SUMMARY OF THE INVENTION

It is an object of the present invention to eliminate such various faults inherent to vinyl acetate resin emulsion and to make resin emulsion composition with excellent workability, heat and water resistance and storage life available. Furthermore, the vinyl acetate resin emulsion composition of the present invention comprises vinyl acetate resin emulsion, produced by emulsion-polymerizing or -copolymerizing vinyl acetate in the presence of polyvinyl alcohol, to which a water soluble compound having alcoholic OH group is added during emulsion-polymerization or -copolymerization reaction.

BRIEF DESCRIPTION OF THE DRAWINGS

FIGS. 5 to 9 are the electron micrographs showing the particle structures of emulsions of comparative Examples 2 to 6, i.e., five vinyl acetate resin emulsions.

DETAILED DESCRIPTION OF THE PREFERRED EMBODIMENTS

Figure 1:
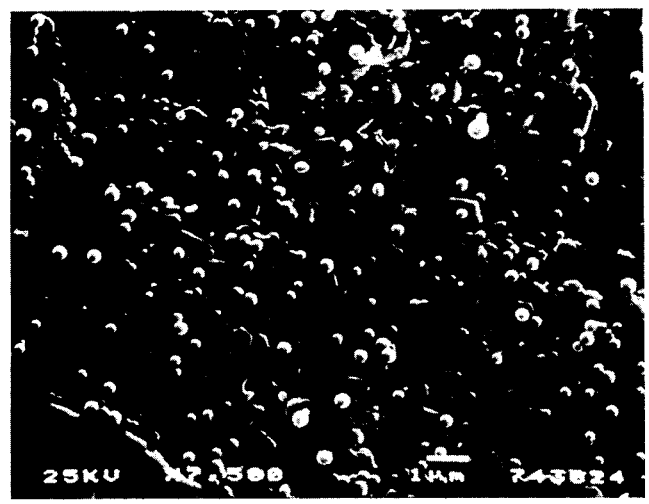
FIGS. 1 to 4 are the electron micrographs showing the particle structures of emulsion compositions of Examples 1 to 4, i.e., four vinyl acetate resin emulsion compositions of the present invention.

The water soluble compound with alcoholic OH group to be contained in the composition of the present invention (hereinafter called "the compound") may be any substance so long as it does not inhibit or prohibit emulsion polymerization or copolymerization but, generally, the following substances are used. The examples of monohydric alcohol are:

Methanol: $CH_3OH$, Ethanol: $CH_3CH_2OH$, Isopropanol: $CH_3CH(OH)CH_3$, Tertiary butanol: $CH_3C(CH_3)_2OH$.

The examples of glycol are:

Ethylene glycol: $C_2H_4(OH)_2$, propylene glycol: $HOC_2H_3(CH_3)OH$, diethylene glycol: $HOC_2H_4OC_2H_4OH$, triethylene glycol: $HOC_2H_4OC_2H_4 \bullet OC_2H_4OH$, hexylene glycol: $HO(CH_3)C_3H_3(CH_3)_2OH$, trimethylene glycol: $C_3H_6(OH)_2$, 3-methyl-1, 3-butanediol: $CH_3C(CH_3)OHCH_2CH_2OH$.

The examples of glycol ether are:

Ethylene glycol monomethyl ether: $CH_3OC_2H_4OH$, ethylene glycol monoethyl ether: $C_2H_5OC_2H_4OH$, ethylene glycol monobuthyl ether: $C_4H_9OC_2H_4OH$, diethylene glycol monomethyl ether: $CH_3O(C_2H_4O)_2H$, diethylene glycol monobuthyl ether: $C_4H_9OC_2H_4OC_2H_4OH$, propylene glycol monomethyl ether: $CH_3OC_3H_6OH$, propylene glycol monoethyl ether: $C_2H_5OC_3H_6OH$, ethylene glycol mono-tertiary-buthyl ether: $(CH_3)_3COCH_2CH_2OH$, 3-methoxy-1-butanol: $CH_3CH(OCH_3)CH_2OH_2OH$, 3-methyl-3-methoxy butanol: $CH_3O(CH_3)_2CH_2CH_2OH$.

The examples of polyglycols are:

Polyethylene glycol of average molecular weight of 200, 300, 400, 600, 1000 or 1500: $HO(CH_2CH_2O)_nCH_2CH_2OH$.

The water soluble property as mentioned of the present invention means that 100 g of compound of the present invention dissolved in 100 cc of 20°C. water does not separate or precipitate even if the compound is left to stand.

In the case of composition according to the present invention, the preferable amount of the compound to be added is 0.5–15% by weight based on vinyl acetate resin emulsion. The effect will be too small when the compound is less than 0.5% by weight, and, will result in the unstable composition of emulsion if the compound exceeds 15%. Therefore, 0.5% to 15% by weight should be most suitable in practice.

The compound should be added to vinyl acetate resin emulsion during the polymerization process of vinyl acetate. No effect can be expected if the compound is added after the polymerization process is completed. The emulsion polymerization condition of vinyl acetate for obtaining vinyl acetate resin emulsion composition of the present invention is not subjected to any particularly specified conditions and, with regard to time and temperature for polymerization and the way to add vinyl acetate monomer, it can be carried out in accordance with generally known conditions.

The vinyl acetate resin emulsion composition of the present invention, for example, can be obtained by charging water, polyvinyl alcohol and the compound into a reactor equipped with an agitator, thermometer, dropping device and reflux condenser and, then, after heating and dissolving the content, adding vinyl acetate monomer and polymerization catalyst at adequate temperature, and emulsion-polymerizing the content for several hours. pH adjuster such as ammonium carbonate or tartaric acid or reducing agent such as Na-formaldehydesulfoxylate or L-ascorbic acid may also be present in the polymerization system when necessary.

Vinyl acetate for producing the composition of the present invention can be either only vinyl acetate monomer, or mixture of vinyl acetate monomer and other polymerizable monomers such as vinyl propionate, acrylic ester, methacrylic ester, etc. In other words, the vinyl acetate resin emulsion used in the present invention can be obtained either by emulsion polymerization or emulsion copolymerization.

For producing the composition of the present invention, polyvinyl alcohol with polymerization degree of 100 to 4,500 and saponification value not less than 65 mol% for normal application may be preferably used. It can also be modified polyvinyl alcohol such as carboxyl modified polyvinyl alcohol. It may also be used, if necessary, simultaneously with anionic, cationic or nonionic surfactant normally in use. For the emulsion polymerization or copolymerization catalyst to produce the composition of the present invention, persulfate such as potassium persulfate, ammonium persulfate or peroxide such as hydrogen peroxide or a redox catalyst combined the above mentioned peroxide and reducing agents are suitable.

The outstanding features of the vinyl acetate resin emulsion composition of the present invention are believed to originate from the following reasons; the compound(s) has favorable properties as a dispersant which facilitates emulsion polymerization and, moreover, the particle structure of the resultant vinyl acetate resin emulsion, in comparison with that of conventional emulsion, is such that the particles are moderately dispersed, not adhering to each other, and the particle sizes of the emulsion are as small as 0.2 to 0.4 μm against 0.5–1.0 μm of conventional emulsion. The compound therefore serves as a good solvent for polyvinyl alcohol and vinyl acetate resin, unlike the conventional solvents and plasticizers.

As mentioned above, the vinyl acetate resin emulsion composition of the present invention sustains low viscosity even at high concentration and shows less increase of viscosity in winter time as, when compared with conventional types of emulsion, the particle sizes are smaller or less than 0.5 μm, and have less tendency of aggregating to each other.

Therefore, the composition of the present invention, when applied as an adhesive, has excellent strength and heat resistance and, when used as paint, fiber, ceramic binder, and for finishing papers, has an excellent binding property.

EXAMPLES 1-4 AND COMPARATIVE EXAMPLES 1-6

54.9 g of water, 4 g of polyvinyl alcohol having a saponification value of 88 mol% and a polymerization degree of 1700 (Trade name Kuraray POVAL 217 of Kuraray Co., Ltd.), 5 g of any kind of compound used in the present invention as shown in Table 1 and 0.1 g of ammonium carbonate have been charged into a reactor equipped with agitator, thermometer, dropping device and reflux condenser. It was then heated to 80°C. while being stirred for 30 minutes to dissolve the contents. 1 g of 10% water solution of ammonium persulfate and 35 g of vinyl acetate monomer were added by slowly dropping into it over three to four hours. After this drop charging, the contents were then cooled after being aged for 30 minutes at the same temperature as above.

The vinyl acetate resin emulsion composition thus produced by emulsion-polymerizing vinyl acetate monomer has been tested for viscosity, water resistance of the dry film and solids content and the results are shown in Table 1. For comparison purposes, the viscosity, water resistance and solids content have been tested of the vinyl acetate resin emulsion produced in the same manner as Examples 1-4, except that the compound used in Examples 1-4 was replaced with water-insoluble dibutyl phthalate (DBP), (Comparative Example 5), and also of commercial vinyl acetate resin emulsion (Trade name Bond $CH_{18}$ of Konishi Co., Ltd.), (Comparative Example 6), in the same manner and the results are also shown in Table 1.

Furthermore, 54.9 g of water, 4 g of polyvinyl alcohol and 0.1 g of the same ammonium carbonate as Examples 1-4, have been charged into the same reactor as the above. It was then heated to 80°C. while being stirred for 30 minutes to dissolve the contents. 1 g of 10% water solution of ammonium persulfate and 35 g of vinyl acetate monomer were added by slowly dropping into it for four hours. After the drop charging, the contents were then aged for 30 minutes at the same temperature as above. Vinyl acetate resin emulsion (Comparative Examples 2-4) obtained by adding 5 g of various types of compounds used in the present invention as shown in Table 1 and thorough stirring and cooling has been tested for viscosity, water resistance and solids content in the same manner as above, and the results are shown in Table 1. (Comparative Example 1 could not be tested as it was gelled during the emulsifying process).

Figure 2:
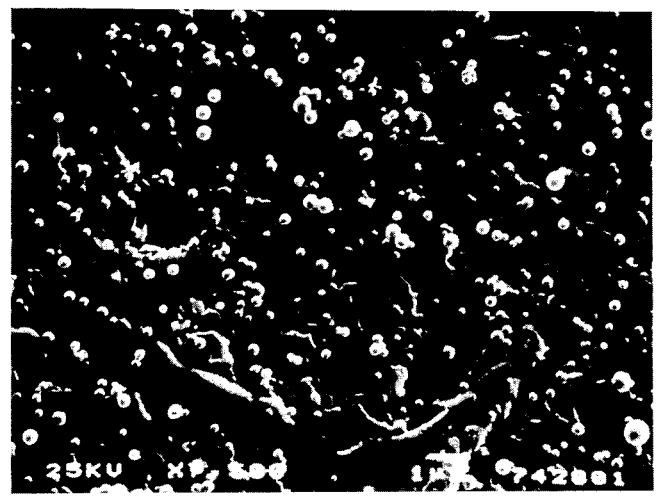
Figure 3:
Figure 4:
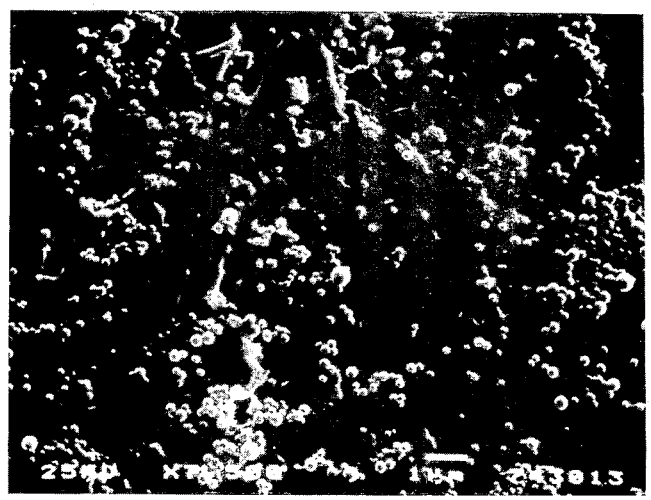

Electron microscopic tests have been made on the particle structure of the vinyl acetate resin emulsion compositions as shown in Examples 1-4, using JEOL Ltd.'s scanning electron microscope JSM-T220 and the results are shown in FIGS. 1-4 (all in 1:7,500 magnification).

Figure 5:
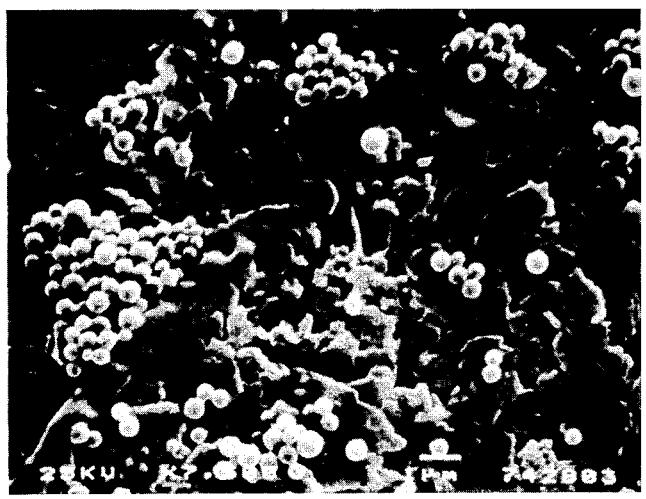
Figure 6:
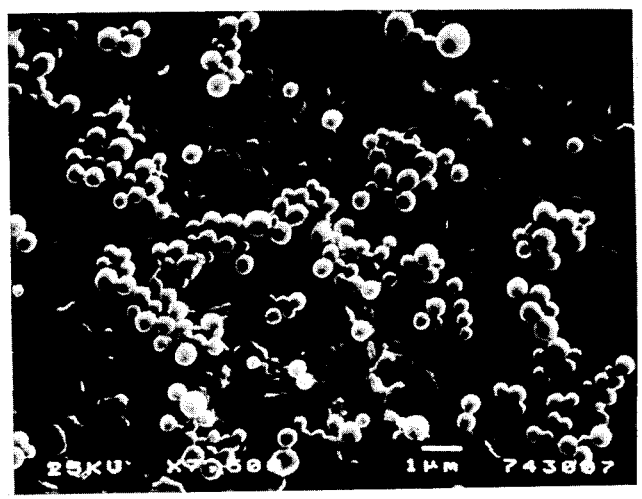
Figure 7:
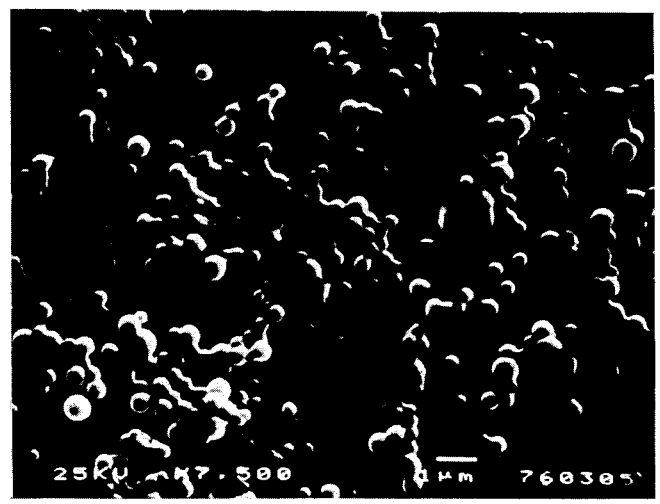
Figure 8:
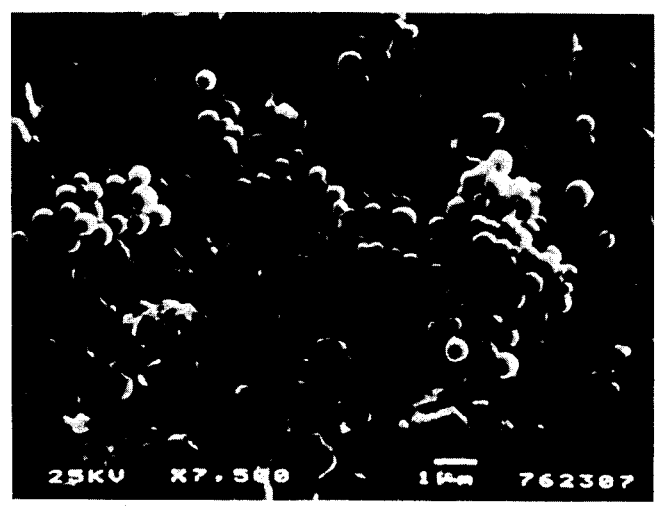

For comparison purposes, the particle structure of the emulsion of Comparative Examples 2-6 have also been tested using said electron microscope and the results are shown in FIGS. 5-9 (all in 1:7,500 magnification.)

By comparing FIGS. 1-4 with FIGS. 5-9, it becomes apparent that the particle sizes are smaller and particles have less tendency of adhering to each other and more favorably dispersing in the vinyl acetate resin emulsion composition of the present invention than in the vinyl acetate resin emulsion of Comparative Examples 2-4 which has been produced by adding the compound used in the present invention after the completion of emulsion polymerization and also in the conventional vinyl acetate resin emulsion as the Comparative Examples 5-6.

TABLE 1

| Items | Compound | Examples | | | |
|---|---|---|---|---|---|
| | | 1 | 2 | 3 | 4 |
| | | Isopropyl alcohol | 3-methyl-1,3-butanediol | glycol of av. 3-methoxy-1-butanol | Polyethylene moledular weight 200 |
| Viscosity (cps) | 30° C. | 3,250 | 5,500 | 3,600 | 6,000 |
| | 0° C. | 12,025 | 13,200 | 12,600 | 24,000 |
| Increase in Viscosity (times) | | 3.7 | 2.4 | 3.5 | 4.0 |
| Water resistance (second) | | 180 or more | 180 or more | 180 or more | 180 or more |
| Solids content | | 39.0 | 43.2 | 43.0 | 43.5 |

TABLE 1-continued

| (%) Particle size (μm) | 0.2–0.4 | 0.2–0.4 | 0.2–0.4 | 0.2–0.4 | | |
|---|---|---|---|---|---|---|
| | | | Comparitive Examples | | | |
| | 1 | 2 | 3 | 4 | 5 | 6 Polyethylene |
| Items | Compound Isopropyl alcohol | 3-methyl-1,3-butanediol | 3-methoxy-1-butanol | glycol of av. moledular weight 200 | DBP | Bond CH$_{18}$ |
| Viscosity (cps) 30° C. | Gelled and unable to measure | 9.050 | 8,600 | 9,700 | 49,000 | 31,000 |
| 0° C. | Gelled and unable to measure | 36,200 | 35,260 | 40,740 | 250,000 | 155,000 |
| Increase in Viscosity (times) | — | 4.0 | 4.1 | 4.2 | 5.1 | 5.0 |
| Water resistance (second) | — | 90 | 90 | 120 | 40 | 50 |
| Solids content (%) | — | 43.3 | 43.2 | 43.7 | 43.1 | 40.5 |
| Particle size (μm) | — | 0.5–0.7 | 0.5–0.7 | 0.5–0.9 | 0.5–0.7 | 0.5–0.8 |

Note:
1 Using a Brookfield type viscometer. "0° C." means that the viscosities of samples were measured by after they had been left in a refrigerator at 0° C. for 24 hours.
2 It shows the ratio between the viscosities at 30° C. and 0° C.
3 Emulsion composition was spread over a glass plate to form a continuous 0.2 mm thick film and left at room temperature (20° C.) for 3 days. The glass plate was then placed horizontally and in close contact over a piece of newspaper with the film facing upward on which a drop of 20° C. water was dropped and the time, upon lapse of which 8-point "Hirgana" types below the wet film became illegible, was measured.
4 After leaving lg. of emulsion in a 100° C. over for 60 minutes, it was measured while leaving it in a desiccator.

Note: (1) Using a Brookfield type viscometer. "0°C." means that the viscosities of samples were measured by after they had been left in a refrigerator at 0°C. for 24 hours.

(2) It shows the ratio between the viscosities at 30°C. and 0°C.

(3) Emulsion composition was spread over a glass plate to form a continuous 0.2 mm thick film and left at room temperature (20°C.) for 3 days. The glass plate was then placed horizontally and in close contact over a piece of newspaper with the film facing upward on which a drop of 20°C. water was dropped and the time, upon lapse of which 8-point "Hiragana" types below the wet film became illegible, was measured.

(4) After leaving 1 g. of emulsion in a 100°C. oven for 60 minutes, it was measured while leaving it in a desiccator.

(5) It was measured from electron micrographs. As apparent from the results shown in Table 1, the emulsion composition of the present invention obtained from Examples 1-4 are significantly lower in the viscosity and also the viscosity was less dependent on temperature than in the case of conventional vinyl emulsion as Comparative Examples 2-6. Furthermore, with regard to the water resistance, types were sufficiently legible even after 180 seconds in the case of the emulsion of the present invention whereas in the case of the conventional vinyl acetate emulsion of Comparative Examples 2-6 types became illegible after 40 to 120 seconds. As apparent from these results, the emulsion composition of the present invention is superior in its water resistance.

EXAMPLES 5-10 AND COMPARATIVE EXAMPLE 7

In these Examples, water of the respective amount as shown in Table 2 together with polyvinyl alcohol, ethylene glycol monotertiary butylether and ammonium carbonate of the amount as shown in Table 2 have been charged in the same type of reactor as used for Examples 1-4. The contents were heated to 80°C. while being stirred for 30 minutes to dissolve the contents. 10% water solution of ammonium persulfate and vinyl acetate monomer in the amount as shown in Table 2 were added by dropping for 4 hours and aged for 30 minutes at the same temperature as above after the drop charging, and then cooled.

The vinyl acetate resin emulsion composition thus produced by emulsion polymerizing acetate vinyl monomer in the above mentioned process has been tested for viscosity and solids content by the same manner as applied to Examples 1-4 and the results are shown in Table 2.

For comparison purposes, the vinyl acetate resin emulsion (Comparative Example 7) produced in the same manner as Example 5, except that ethyleneglycol monotertiary butylether was replaced by water, has been tested in the same manner as Example 5 for the respective viscosity and solids content and the results are also shown in Table 2.

TABLE 2

| | Examples | | | | | | Comparative Examples | |
|---|---|---|---|---|---|---|---|---|
| Item | 5 | 6 | 7 | 8 | 9 | 10 | 7 | 5 |
| Water (g) | 54.9 | 58.9 | 56.9 | 54.9 | 49.9 | 44.9 | 59.9 | 54.9 |
| Polyvinyl alcohol (g) | 4.0 | 4.0 | 4.0 | 4.0 | 4.0 | 4.0 | 4.0 | 4.0 |
| Ammonium carbonate (g) | 0.1 | 0.1 | 0.1 | 0.1 | 0.1 | 0.1 | 0.1 | 0.1 |
| 10% Water Solu- | 1.0 | 1.0 | 1.0 | 1.0 | 1.0 | 1.0 | 1.0 | 1.0 |

TABLE 2-continued

| Item | Examples | | | | | | Comparative Examples | |
|---|---|---|---|---|---|---|---|---|
| | 5 | 6 | 7 | 8 | 9 | 10 | 7 | 5 |
| tion of Ammonium persulfate (g) | | | | | | | | |
| Vinyl acetate monomer (g) | 35.0 | 35.0 | 35.0 | 35.0 | 35.0 | 35.0 | 35.0 | 35.0 |
| Ethylene glycol monotertiary butyl ether (g) | 0.5 | 1.0 | 3.0 | 5.0 | 10.0 | 15.0 | 0 | DBP 5.0 |
| Total (g) | 100.0 | 100.0 | 100.0 | 100.0 | 100.0 | 100.0 | 100.0 | 100.0 |
| Solids content (%) | 39.2 | 40.3 | 41.0 | 42.8 | 48.3 | 49.0 | 38.7 | 43.1 |
| Viscosity 30° C. (cps) | 9,000 | 8,250 | 10,700 | 6,250 | 3,400 | 3,200 | 10,750 | 49,000 |
| 0° C. | 37,800 | 33,000 | 34,240 | 15,625 | 8,160 | 7,680 | 48,375 | 250,000 |
| Increase in Viscosity (times) | 4.2 | 4.0 | 3.2 | 2.5 | 2.4 | 2.4 | 4.5 | 5.1 |

As apparent from the results shown in Table 2, the emulsion composition of the present invention as Examples 5–10 is significantly lower in the viscosity and the viscosity is less temperature dependent when compared with the conventional vinyl acetate resin emulsion of Comparative Example 7.

Moreover, the bond strength at high temperature (60°C.) was compared between the emulsion composition of Example 8 and the emulsion of Comparative Example 5. The bond strengths at high temperature (60°C.) of both emulsions were measured immediately after taking them out from 60°C. dryer after leaving them in it for one hour. The measurement has been made according to the process stipulated in JIS (Japanese Industrial Standard) K6804. The results have shown that the bond strength at high temperature (60°C.) of the emulsion composition of Example 8 was 44 kg/cm$^2$ and superior to that of the conventional emulsion of Comparative Example 5, which was 32 kg/cm$^2$.

EXAMPLE 11 AND COMPARATIVE EXAMPLE 8

38.9 g of water, 4 g of carboxyl modified polyvinyl alcohol having a saponification value of 80 mol% and a polymerization degree of 600 (Trade name Kuraray POVAL KL506 of Kuraray Co., Ltd.), 5 g of 3-methoxy-1-butanol and 0.1 g of ammonium carbonate have been charged into the same reactor as the one used for Examples 1–4. It was then heated to 75°C. while being stirred for 30 minutes to dissolve the contents. 1 g of 10% water solution of ammonium persulfate was and, further, 51 g of vinyl acetate monomer was added by slowly dropping into it for five hours. After the drop charging, the contents were then cooled after being aged for 30 minutes at the same temperature as above. The vinyl acetate resin emulsion composition thus produced by emulsion-polymerizing vinyl acetate has been tested for viscosity and solids content in the same manner as Examples 1–4 and the results are shown in Table 3.

For comparison purposes, the viscosity and solids content have been tested of the vinyl acetate resin emulsion (Comparative Example 8) produced in the same manner as Example 11, except for replacing 3-methoxy-1-butanol by DBP, and the results are shown in Table 3.

TABLE 3

| | Example 11 | Comparative Example 8 |
|---|---|---|
| Viscosity 30° C. | 38,000 | 149,000 |
| (cps) 0° C. | 76,000 | 387,400 |
| Increase in Viscosity (times) | 2.0 | 2.6 |
| Solids content (%) | 59.8 | 59.7 |

As apparent from the results shown in Table 3, the emulsion composition of the present invention, i.e., Example 11, is less dependent on temperature than the conventional emulsion of Comparative Example 8.

Furthermore, when the emulsion composition of Example 11 has been thinly coated on the surface of a piece of lauan plywood by a glass rod, it was possible to coat easily since the viscosity was relatively low despite its high (59.8%) concentration (solids content).

The conventional emulsion of Comparative Example 8, in contrast, could not be coated easily because of its high viscosity.

EXAMPLE 12 AND COMPARATIVE EXAMPLES 9–10

45.8 g of water, 4 g of polyvinyl alcohol having a saponification value of 88 mol% and a polymerization degree of 500 (Trade name Kuraray POVAL 205 of Kuraray Co., Ltd.), 5 g of ethylene glycol monotertiary butylether and 0.1 g of tartaric acid have been charged into the same reactor as the one used for Examples 1–4. It was then heated to 80°C. while being stirred for 30 minutes to dissolve the contents. 0.1 g of hydrogen peroxide was then added and, further, 35 g of vinyl acetate monomer was added by slowly dropping into it for two hours. The contents were then added with 20 g of water and cooled after being aged for 30 minutes at the same temperature as above. The vinyl acetate resin emulsion composition thus produced by emulsion-polymerizing vinyl acetate has been tested for viscosity and solids content in the same manner as Examples 1–4 and the results are shown in Table 4. Moreover, the storage life of the emulsion composition thus obtained has been tested by leaving it in a 200 cc of glass bottle under room temperature (20°C.), the results of which are shown in Table 4.

Meanwhile, 35.8 g of water, 4 g of polyvinyl alcohol having a saponification value of 88 mol% and a polymerization degree of 500 (Trade name Kuraray POVAL 205 of Kuraray Co., Ltd.), 5 g of dibutyl phthalate (DBP) and 0.1 g of tartaric acid have been charged into a reactor. It was then heated to 80°C. while being stirred for 30 minutes to dissolve the contents. 0.1 g of hydrogen peroxide was then added and, further, 35 g of vinyl acetate monomer was added by slowly dropping into it for four hours. The contents were then added with 20 g of water and cooled after being aged for 30 minutes at the same temperature as above. The vinyl acetate resin emulsion (Comparative Example 9) thus produced by emulsion-polymerizing vinyl acetate has been tested for viscosity, solids content and storage life for comparison purposes and the results are shown in Table 4.

In addition, the viscosity, solids content and storage life of commercial vinyl acetate resin emulsion (Trade name Bond CH 3000L of Konishi Co., Ltd.) (Comparative Example 10) have been measured in the same manner as above for comparison purposes and the results are shown in Table 4.

TABLE 4

|  | Example 12 | Comparative Example 9 | Comparative Example 10 |
|---|---|---|---|
| Viscosity (cps) 30° C. | 150 | 310 | 520 |
| Solids content (%) | 39.0 | 39.8 | 40.8 |
| Storage life | No changes after 3 months | Separation & sedimentation observed after 1 month | Separation & sedimentation observed afte 1 month |

As apparent from Table 4, as compared with Comparative Examples 9 and 10, no irregularity such as separation and sedimentation has been observed after three months in the emulsion composition of Example 12 of the prevent invention despite its low viscosity. Hence, the emulsion composition showed good storage life. In contrast, separation and sedimentation were observed in the conventional vinyl acetate resin emulsion of Comparative Examples 9 and 10 after one month.

EXAMPLE 13 AND COMPARATIVE EXAMPLES 11-12

45.8 g of water, 4 g of polyvinyl alcohol having a saponification value of 88 mol% and a polymerization degree of 500 (Trade name Kuraray POVAL 205 of Kuraray Co., Ltd.), 5 g of 3-methyl-3-methoxybutanol and 0.1 g of tartaric acid have been charged into the same reactor as the one for Examples 1-4. It was then heated to 75°C. while being stirred for 30 minutes to dissolve the contents. 0.1 g of hydrogen peroxide was then added and, further, 35 g of vinyl acetate monomer was added by slowly dropping into it for two hours. The contents were then added with 20 g of water and cooled after being aged for 30 minutes at the same temperature as above. The vinyl acetate resin emulsion composition thus produced by emulsion-polymerizing vinyl acetate has been tested for viscosity and solids content in the same manner as Examples 1-4 and the results are shown in Table 5.

Meanwhile, 35.8 g of water, 4 g of polyvinyl alcohol having a saponification value of 88 mol% and a polymerization degree of 500 (Trade name Kuraray POVAL 205 of Kuraray Co., Ltd.), 5 g of dibutyl phtalate (DBP) and 0.1 g of tartaric acid have been charged into a reactor. It was then heated to 75°C. while being stirred for 30 minutes to dissolve the contents. 0.1 g of hydrogen peroxide was then added and, further, 35 g of vinyl acetate monomer was added by slowly dropping into it for two hours. The contents were then added with 20 g of water and cooled after being aged for 30 minutes at the same temperature as above. The vinyl acetate resin emulsion (Comparative Example 11) thus produced by emulsion-polymerizing vinyl acetate has been tested for viscosity and solids content for comparison purposes and the results are shown in Table 5.

Furthermore, commercial vinyl acetate resin emulsion (Trade name Bond CH3000L of Konishi Co., Ltd.) (Comparative Example 12) has also been tested for viscosity, solids content and storage life for comparison and the results are shown in Table 5.

TABLE 5

|  | Example 13 | Comparative Example 11 | Comparative Example 12 |
|---|---|---|---|
| Viscosity (cps) 30° C. | 150 | 300 | 500 |
| Solids content (%) | 39.1 | 39.9 | 40.0 |
| Storage life | No changes after 3 months | Separation & sedimentation observed after 1 month | Separation & sedimentation observed after 1 month |

As apparent from Table 5, as compared with Comparative Examples 11 and 12, no irregularity such as separation and sedimentation has been observed after three months in the emulsion composition of Example 13 of the prevent invention despite its low viscosity. Hence, the emulsion composition showed good storage life. In contrast, separation and sedimentation were observed in the conventional vinyl acetate resin emulsion of Comparative Examples 11 and 12 after one month.

EXAMPLE 14 AND COMPARATIVE EXAMPLES 13

55.8 g of water, 4 g of the same polyvinyl alcohol as the one used for Examples 1-4, and 0.1 g of ammonium carbonate have been charged into the same reactor as the one used in Examples 1-4. It was then heated to 80°C. while being stirred for 30 minutes to dissolve the contents. A mixture of 1 g of 10% water solution of ammonium persulfate, 30g of vinyl acetate monomer and 5 g of ethylene glycol monotertiary buthyl ether was added by slowly dropping into it for four hours. After drop charging, the contents were emulsion-copolymerized by slowing adding 5 g of butyl acrylate at the same temperature and cooled after aged for 30 minutes at the same temperature as above. By testing the vinyl acetate resin emulsion composition thus obtained by emulsion-copolymerizing vinyl acetate and butyl acrylate for viscosity by the same manner as Examples 1-4, it was found to be 6,000 cps at 30°C. For comparison purposes, the vinyl acetate resin emulsion (Comparative Example 13) thus obtained by the same manner as Example 14, except for replacing ethylene glycol monotertiary butyl ether by DBP, was tested for viscosity in the same manner as Examples 1-4, and the viscosity was found to be 10,600 cps at 30°C.

As apparent from the comparison between Example 14 and Comparative Example 13, the emulsion composition of the present invention has shown significantly lower viscosity than the conventional product of Comparative Example 13 even when produced by emulsion-copolymerization by adding a mixture of vinyl acetate monomer and ethylene glycol monotertiary butyl ether to the polymerization system.

The vinyl acetate resin emulsion composition of the present invention has the following excellent characteristics:

(1) The viscosity is less temperature dependent, the viscosity increase at a lower temperature range is very little and offers good workability, (2) It has sufficient ability to form film at low temperature without the aid of plasticizer such as DBP and the film thus produced is relatively strong and has good heat resistance, (3) Low viscosity product can be available even at a high solids content and offers good workability, (4) No separation and sedimentation occurs after a long period of storage at low viscosity and offers good storage life, (5) Dry film obtained from the emulsion composition has good water resistance, and (6) Particles of the emulsion composition are much smaller than those of conventional emulsion, and particles of the emulsion composition do not aggregate and are uniformly dispersed, therefore, the emulsion composition of the present invention offers outstanding features such as excellent binding property as a binder. The above-mentioned characteristics of the emulsion composition of the present invention are not available with the conventional vinyl acetate resin emulsion.

It renders the emulsion composition of the present invention extremely effective as adhesive for wood, paper and inorganic materials and also as a binder for water paint, paper coating material, dust-proof coating material, coating material for huge heap of coal dust, sand, short fibers, ceramic powder, etc.

What is claimed is:

1. Vinyl acetate resin emulsion composition comprising vinyl acetate resin emulsion, produced by emulsion-polymerizing vinyl acetate in the presence of polyvinyl alcohol, to which glycol ether is added during emulsion-polymerization reaction, said composition having excellent properties of low viscosity, which has a small temperature-dependency, and good water resistance.

2. The vinyl acetate resin emulsion composition according to claim 1, wherein the glycolether is selected from the group consisting of ethylene glycol monomethyl ether, ethylene glycol monoethyl ether, ethylene glycol monobutyl ether, diethylene glycol monomethyl ether, diethylene glycol monobutyl ether, propylene glycol monomethyl ether, proplylene glycol monoethyl ether, ethylene glycol monotertiary butyl ether, 3-methoxy-1-butanol and 3-methyl-3-methoxybutonal.

3. The vinyl acetate resin emulsion composition according to claim 1, wherein the added amount of the glycolether is 0.5-15% by weight.

4. The vinyl acetate resin emulsion composition according to claim 1, wherein the polyvinyl alcohol has a polymerization degree of 100-4500 and a saponification value of not less than 65 mol%.

5. The vinyl acetate resin emulsion composition according to claim 1, wherein the vinyl acetate resin emulsion is a product obtained by emulsion-polymerizing vinyl acetate under the presence of polymerizing catalyst selected from the group consisting of persulfate, peroxide and redox catalyst.

6. The vinyl acetate resin emulsion composition according to claim 5, wherein the vinyl acetate resin emulsion is a product obtained by emulsion-polymerizing vinyl acetate under the presence of at least one of the elements selected from the group consisting of pH adjuster and reducing agents.

* * * * *

UNITED STATES PATENT AND TRADEMARK OFFICE
CERTIFICATE OF CORRECTION

PATENT NO.  : 4,963,611
DATED       : October 16, 1990
INVENTOR(S) : Shigeru NAGASAWA et al.

It is certified that error appears in the above-identified patent and that said Letters Patent is hereby corrected as shown below:

In column 2, line 17, change "$CH_3CH(OCH_3)CH_2OH_2OH$" to -- $CH_3CH(OCH_3)CH_2OH_2OH$ --.

In column 2, line 18, change "$CH_3O(CH_3)_2CH_2CH_2OH$" to -- $CH_3OC(CH_3)_2CH_2CH_2OH$ --.

In Table 1 at the bottom of columns 3 and 4, in the Example 3 column, change "glycol of av. 3-methoxy-1-butanol" to -- 3-methoxy-1-butanol --.

In Table 1 which is continued at the top of columns 5 and 6, in the Example 4 column, change "glycol of av. moledular weight 200" to -- Polyethylene glycol of av. moledular weight 200 --.

At the top of columns 5 and 6, delete entirely the Notes 1-4 in small print immediately following Table 1.

In Column 5, line 51, insert -- acetate resin -- after "vinyl".

In Table 2 at the bottom of columns 5 and 6, in the Example 5 column, change "54.9" to -- 59.4 --.

UNITED STATES PATENT AND TRADEMARK OFFICE
CERTIFICATE OF CORRECTION

PATENT NO. : 4,963,611

DATED : October 16, 1990

INVENTOR(S) : Shigeru NAGASAWA et al.

It is certified that error appears in the above-identified patent and that said Letters Patent is hereby corrected as shown below:

In Table 4, column 9, line 29, in the Comparative Example 10 column, change "observe afte" to -- observed after --.

Signed and Sealed this

Nineteenth Day of May, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,963,611

DATED : October 16, 1990

INVENTOR(S) : Shigeru Nagasawa, et. al.

It is certified that error appears in the above-identified patent and that said Letters Patent is hereby corrected as shown below:

In column 2, line 17, change "$CH_3CH(OCH_3)CH_2OH_2OH$" to -- $CH_3CH(OCH_3)CH_2CH_2OH$ --.

In Table 1 at the bottom of columns 3 and 4, in the Example 4 column, change "Polyethylene moledular weight 200" to -- Polyethylene glycol of av. molecular weight 200 --.

In Table 1 which is continued at the top of columns 5 and 6, in the Example 4 column, change "moledular" to -- molecular --.

In Table 1 at the top of columns 5 and 6 in the Example 6 column, delete "Polyethylene".

In Table 1 at the top of column 5 and 6 in the Example 4 column insert --Polyethylene--. (before glycol of av.)

Signed and Sealed this

Fourth Day of January, 1994

*Attest:*

BRUCE LEHMAN

*Attesting Officer*     *Commissioner of Patents and Trademarks*